United States Patent

[11] 3,633,263

[72] Inventor Roy Hoeksema
 2413 South Mayflower Ave., Monrovia, Calif. 91016
[21] Appl. No. 837,173
[22] Filed June 27, 1969
[45] Patented Jan. 11, 1972

[54] METHOD OF MAKING TIRE-WEIGHTING DEVICE
 4 Claims, 4 Drawing Figs.
[52] U.S. Cl..................................................... 29/412, 301/5 B
[51] Int. Cl. ............................................... B23p 17/00
[50] Field of Search............................................ 29/412, 159.1, 159, 413, 414, 417; 301/5 B

[56] References Cited
UNITED STATES PATENTS

| | | | |
|---|---|---|---|
| 2,122,065 | 6/1938 | Hume............................ | 301/5 |
| 2,197,364 | 4/1940 | Hatch............................ | 301/5 |
| 2,309,666 | 2/1943 | Parker........................... | 29/157 |
| 2,614,274 | 10/1952 | Moore........................... | 29/417 X |
| 2,643,446 | 6/1953 | Matthysse et al. ............. | 29/417 X |
| 2,950,142 | 8/1960 | Lyon ............................ | 301/5 |
| 3,056,631 | 10/1962 | Mills............................. | 301/5 |

Primary Examiner—John F. Campbell
Assistant Examiner—Victor A. DiPalma
Attorney—White & Haefliger ABSTRACT: Method of forming a wheel-balancing weight by extruding lead through a forming die, shaping the body to have wheel rim congruency, extruding a lug on the weight while forming a recess therearound and staking a clip to the weight by deflecting the lug thereover with the clip located in the recess.

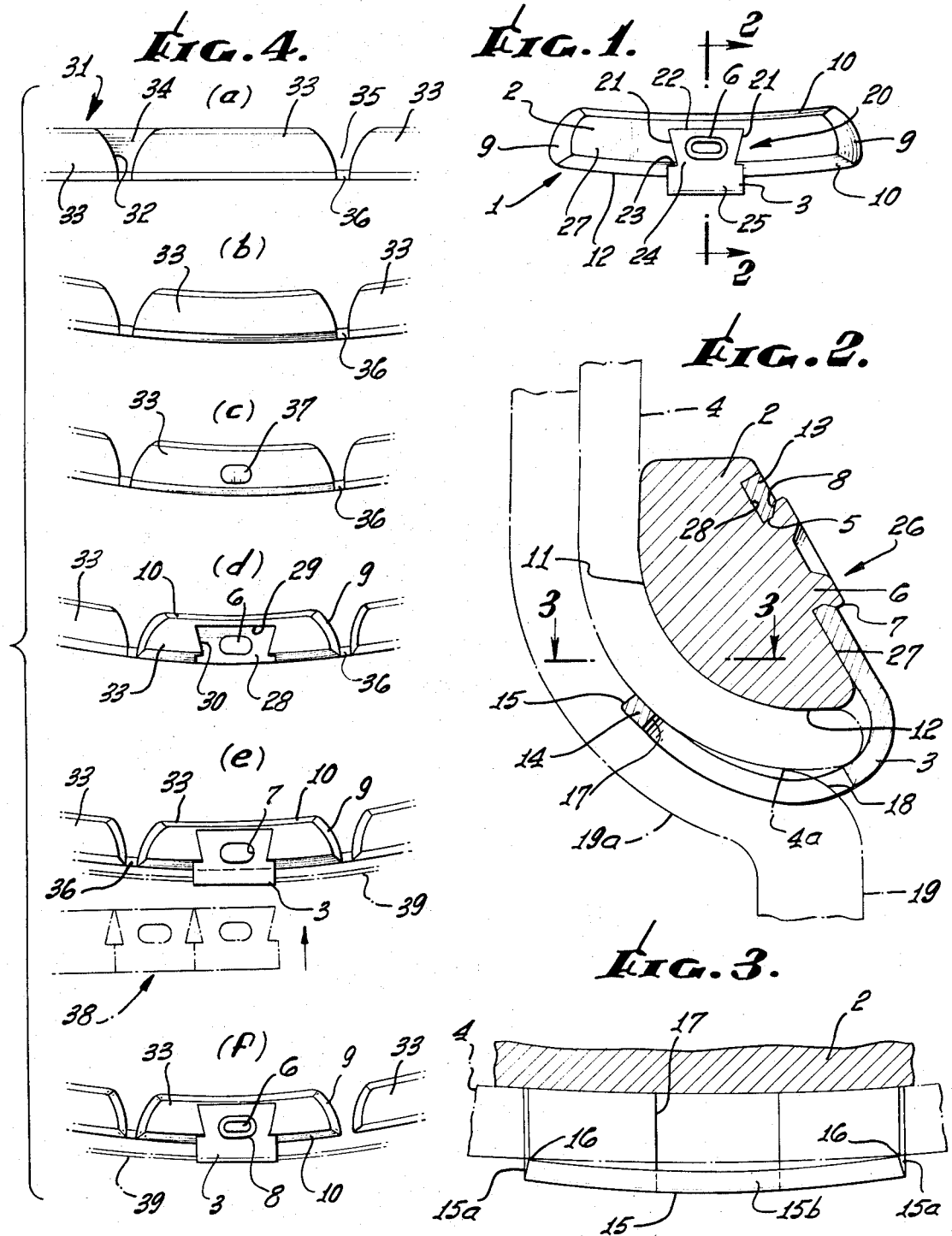

METHOD OF MAKING TIRE-WEIGHTING DEVICE

BACKGROUND OF THE INVENTION

1. Field of the Invention

This invention has to do with wheel-balancing weights and particularly with improvements in the design and fabrication of such weights for achieving greater economy in manufacture and higher reliability in service. The invention employs an extruded rather than cast mass of lead to form the weight body. The invention thus avoids erratic strength characteristics in the weight body caused by differential cooling and interior voids commonly encountered in casting of weights. The extruded body is more dense as well as more uniform in strength. The invention uses an extrusion from the weight body to secure the rim-engaging clip to the body assuring an integrity of weight construction.

2. Prior Art

Wheel-balancing weights have been developed over the years since the introduction of the automobile into their present several forms. Wheel-balancing weights typically will broadly include a weight body, typically lead, and a clip, typically spring steel, for securing the body to the wheel rim. The broadest classification of wheel-balancing weights is into wheel weights which have the rim-engaging clip permanently attached to the weight body and those in which the weight body and clip are separably connectable. The current most popular wheel-balancing weights are those in which the lead is cast in a mold around a clip. This version offers the convenience of a unitary structure which is thought highly of by service station operators although only a single use is possible due to damage to the clip on removal from a rim; the cost of new weights is not considered significant.

The safety of such cast-around-the-clip weights, however, is open to question. The purpose of weights is, of course, to prevent erratic hopping or wobbling of the automobile wheel as it revolves at high speed. In the absence of proper balancing and distribution of wheel weight the driver may lose control of the automobile or at least tire and suspension wear is accelerated. Particularly dangerous is the unexpected loss of a wheel-balancing weight. This may occur where the weight body is readily subject to breakage.

A cast weight is generally formed around a clip by pouring molten lead into a mold cavity in which a clip is supported in appropriate position. It has been found that the thus added lead cools more rapidly about the clip than outward of the clip setting up a different granular structure in the immediate vicinity of the clip. The interface of differently cooled zones is a potential fracture line when the weight is stressed. Because this line is outwardly adjacent the clip on the weight body and in an unsupported area of the body, breakage is likely to occur in installation or use of the clip. Loss of a portion of the weight body unbalances the wheel and subjects the automobile operator to steering and handling hazards.

In addition, from a production standpoint it is awkward to maintain clip alignment during casting and difficult to continually obtain a proper temperature in the molten lead and to properly open and close the casting molds. As a result much wastage occurs in the plant with consequent higher costs and reduced profits.

SUMMARY OF THE INVENTION

This invention overcomes the aforementioned difficulties and hazards basically through extrusion rather than casting of the lead weight body. The body is first extruded from die, e.g., as a part of a series of bodies in a continuously extruded mass. This affords a uniformity and a high degree of density not obtainable by casting techniques and produces a more reliable weight body. Then, in a second extrusion, a lug is raised on the extruded weight body to which the clip is secured so that the clip securement is integral with the body material. No differential cooling is encountered, clip alignment is readily controlled and production economics and improved product reliability are thus obtained.

The invention provides a wheel-balancing weight having a weight body of extrudable lead, a clip for securing the body to a wheel rim and having an opening containing an extrusion of the body lead. The extrusion is deflected into engagement with the clip at the edge of the opening. The weight body may have a recess therein for receiving the clip in keying relation and the clip opening may be located centrally of that portion of the clip which is keyed in the recess. The extrusion engaging the clip may be formed by pressure displacement of body material, e.g., from the recess for securing the clip. In certain embodiments the clip may have a rim engaging portion given a shorter radius of curvature than the rim it engages to have corner bites on the rim.

In a specific form the weight body may be arcuate on two sides to be rim congruent and planar on a third side. The third side is provided with a center portion recess from which the extrusion projects. The clip will typically take the form of a generally U-shaped spring steel member having one flat leg in which the securement opening is formed and which is key fittable into the body recess within the plane of the body with the extrusion projecting through the opening. The clip has a second leg which is curved on one axis to contact the rim and curved on the transverse axis to have corner bites on the rim. The extrusion passing through the clip leg opening may be peened or circumferentially deflected to stake the clip to the weight body.

The invention further contemplates an improved method of manufacturing wheel-balancing weights which includes the steps of extruding a mass of lead through a forming die, shaping the extrudate into a weight body preform having wheel rim congruency, extruding a lug outwardly from the preform transversely of the mass extrusion direction and forming a recess in the preform adjacent the lug, locating a rim-engaging clip on the lug and deflecting the end of the lug to stake the clip in position. The extrusion is preferably effected in a manner to compact the lead mass to eliminate interior voids in the mass. The clip may be supported on a horn while deflecting the staking lug to ensure proper alignment.

BRIEF DESCRIPTION OF THE DRAWINGS

FIG. 1 is a view in elevation of the wheel balancing weight of the present invention;

FIG. 2 is a vertical section thereof taken along line 2—2 of FIG. 1 with the wheel rim and tire additionally shown, in outline;

FIG. 3 is a horizontal section thereof taken along line 3—3 of FIG. 2 showing the clip engagement with the wheel rim; and FIG. 4a–f is a schematic depiction in elevation of the steps in manufacturing the wheel-balancing weights from an extruded mass.

DESCRIPTION OF THE PREFERRED EMBODIMENTS

Referring now to the drawings, in FIGS. 1 and 2 a wheel balancing weight according to the invention is shown at 1 including a weight body 2, formed of extrudable lead in a manner to be described and a clip 3 for securing the body to a wheel rim 4. The clip 3 has an opening 5 containing an extrusion 6 of the body lead. The extrusion 6 is deflected at 7, as by peening the extrusion, into engagement with the clip 3 at the edge 8 of the opening 5. The weight body 2 is beveled at the end edges 9 and side edges 10 to minimize snagging of the weight in use.

The side 11 of the weight body 2 opposite extrusion 6 is rounded conventionally to conform to the ordinary surface contours of a wheel rim and insure a nestling fit on the rim 4. The weight body 2 also conventionally is additionally slightly arcuate at surface 12 opposite the clip 3 to be congruent with the curvature of rim 4.

As best shown in FIG. 2 the clip 3 is novelly secured to the weight body 2 in the present wheel-balancing device by virtue of being staked to the body by an extrusion 6 of the body material. This extrusion 6 is staked at 7 over the clip 3 to hold the clip against the body 2. The body material itself thus forms the clipssecuring means enabling an integral connection which has consequent high strength and reliability. In this respect, the invention obviates the alternatives of threaded openings in the weight body for insertion of screws or the casting in of clip-supporting springs or clips themselves.

The clip 3 is generally U-shaped spring steel member adapted to embrace the periphery 4a of wheel rim 4. The clip 3 has a flat leg 13 generally engaged with the weight body 2 and a second leg 14 which is arcuately configured to engage the wheel rim 4 at a point spaced from the weight body 2 and on the opposite side of the rim from the weight body, thus to hold the body to the rim. With reference to FIG. 3 it will be noted that the edge 15 of leg 14 is arcuate transversely to the leg longitudinal axis with a radius of curvature that is shorter than that of the rim 4. The dual arcuateness of the second clip leg 14 results in corners 15a of clip edge 15 biting into rim 4 at 16 providing a high degree of anchoring for the clip and thus the weight. This anchoring is advantageous in minimizing circumferential creep of the weight around the rim 4 in use. There is further provided in leg 15 an opening 17 which serves to permit entry of a portion 18 of the bead 19a of the tire body 19 into the plane of the clip 3 further securing the weight. In addition the opening 17 is useful for insertion of a prying tool when it is desired to remove the weight from a rim. Clip leg 15 is given an outside radius at 15b (FIG. 2) to avoid cutting the tire bead 19a.

The clip leg 13 has a significant feature of configuration for maximum safety in retention of the weight body 2 on the wheel rim. It will be observed that the leg 13 of the clip 2 is key shaped with lateral cam surfaces 20 formed by inward sloping of the clip sides 21 from the clip base 22 to the clip shoulders 23, forming a neck 24 just below the shoulders. Shoulders 23 continue into the strap 25 which is bent double to join the first and second legs 13 and 14 of the clip.

The clip 3 is mounted on the body 2 by inserting extrusion 6 through opening 5 in the clip. The opening 5 is shown located centrally of the leg 13 of the clip and to be a closed figure. The opening in the clip through which the extrusion passes may be off center in the clip leg or completely to the side, as well, with the extrusion location being similarly adjusted so that the staking relation continues.

The extrusion 6 is formed by selectively compressing the central area 26 of the body 2 on the planar side 27 of the body. The selective compression may be accomplished with an appropriately apertured punch (not shown) which will raise extrusion 6. With a second punch having a key shaped periphery, key-shaped recess 28 is formed in the body 2 adjacent the extrusion 6. Thus with reference to FIG. 4d and FIGS. 1 and 2, a recess 28 is formed in the body to have a base wall 29, and inwardly sloping sidewalls 30 which conform to the clip configuration above described The clip 2 thus is key fittable in recess 28 with its base and sides engageable with the recess walls against unwanted dislodgement of the clip. The extrusion 6 is staked over the edges 8 of the opening 5 in the clip 2 to retain the clip in the recess 28, preferably within the plane of the planar body side 27.

The extrusion 6 when formed as described is formed essentially of displaced body material. Excess depression around the extrusion 6 may be filled with body material subsequently displaced in forming the recess 28. The cross section of the extrusion 6 may be round, polygonal, e.g., triangular or oval as shown or a combination of such figures. The extrusion 6 is, of course, of a thickness providing material and strength sufficient to engage and retain the clip as explained.

The just described wheel-balancing weight is readily adaptable to highly automated manufacture. Thus, with reference to FIGS. 4a-f a lead extrudate 31 as may be formed by reducing and expressing through a forming die, preferably a room temperature, a mass of lead having the cross-sectional configuration desired, is sequentially subjected to forming and assembly operations which provide the final balancing weight.

In FIG. 4a the extruded mass 31 proceeding from the left is scored at 32 defining weight body preforms 33. The scored portion 34 is knocked out leaving a notch 35 between preforms 33 which remain connected by ties 36. The preforms 33 are then bent to rim congruency as shown in FIG. 4b by application of a forming die (not shown). The extrusion 6 location is determined by punching preforms 33 at 37 in FIG. 4c with an ovally apertured punch (not shown). In FIG. 4d, a forming die is applied to form recess 28 in the preform 33 adjacent and circumferentially around extrusion 6, e.g., centrally of the recess. At the same station, the edges 9 of the preform 33 are beveled by coining to a desired contour. Edges 10 are beveled in the extrusion operation. At the next station, clips 3 are fed from a supply, shown in phantom outline at 38, over the extrusion 6, onto the preform 33 and ultimately to seating in the recess 28. Beyond this station tie 36 is removed to separate successive preforms 33. At the next station, the preforms 33 are guided by horn 39 inserted in clip 3 as the extrusion 6 is peened, by means not shown, to deflect the outermost portion of the extrusion over the clip in the manner shown in FIG. 2.

I claim:
1. Method of forming a wheel-balancing weight which includes the steps of extruding a mass of lead through a forming die, shaping the extrudate into a weight body preform having wheel rim congruency, thereafter extruding a lug outwardly from the preform transversely of the mass extrusion direction, forming a recess in the preform adjacent the lug, locating a rim-engaging clip over the lug, and deflecting the end of the lug to stake the clip in position.

2. Method according to claim 1 including also forming said recess about said lug and locating said clip in said recess.

3. Method according to claim 2 including supporting said clip on a horn while deflecting said lug.

4. Method according to claim 1 including compacting said lead mass during extrusion to eliminate interior voids in the mass.

* * * * *